(12) United States Patent
Johnson et al.

(10) Patent No.: US 10,336,229 B2
(45) Date of Patent: Jul. 2, 2019

(54) PIVOTABLE SEAT BACK WITH COAXIAL PIVOTABLE ARMREST

(71) Applicant: Lear Corporation, Southfield, MI (US)

(72) Inventors: Adam Young Johnson, Birmingham (GB); Mark Bell, Cheshire (GB); Christophe Barrillet, Igny (FR)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 15/639,479

(22) Filed: Jun. 30, 2017

(65) Prior Publication Data

US 2019/0001850 A1  Jan. 3, 2019

(51) Int. Cl.
*B60N 2/20* (2006.01)
*B60N 2/75* (2018.01)
*B60N 2/30* (2006.01)

(52) U.S. Cl.
CPC .............. *B60N 2/757* (2018.02); *B60N 2/20* (2013.01); *B60N 2/3084* (2013.01); *B60N 2/753* (2018.02)

(58) Field of Classification Search
CPC ....... B60N 2/757; B60N 2/3084; B60N 2/753
USPC ... 297/188.16, 411.32, 378.1, 117, 116, 115, 297/411.3, 411.31, 411.29, 411.39, 297/411.35, 188.14, 188.18, 112, 113
See application file for complete search history.

(56) References Cited

U.S. PATENT DOCUMENTS

| | | | |
|---|---|---|---|
| 3,114,576 A * | 12/1963 | Herider | A47C 7/30 297/354.1 |
| 4,889,386 A * | 12/1989 | Kochy | B60N 2/225 297/359 |
| 6,179,362 B1 | 1/2001 | Wisniewski et al. | |
| 7,178,865 B2 * | 2/2007 | Yetukuri | B60N 2/757 297/113 |
| 7,559,594 B2 | 7/2009 | McMillen | |
| 2006/0033372 A1 * | 2/2006 | Lee | B60N 2/22 297/378.1 |
| 2007/0236061 A1 | 10/2007 | Meeker et al. | |
| 2016/0185261 A1 | 6/2016 | Hammann et al. | |
| 2017/0001545 A1 | 1/2017 | Simeonidis et al. | |

FOREIGN PATENT DOCUMENTS

| | | |
|---|---|---|
| EP | 1728677 A1 | 12/2006 |
| EP | 2708412 A1 | 3/2014 |
| JP | S60110540 A | 6/1985 |
| JP | H079898 A | 1/1995 |
| WO | 2014044553 A2 | 3/2014 |

OTHER PUBLICATIONS

Patent Act 1977: Combined Search and Examination Report under Section 17 & 18(3), Application No. GB1802980.1, dated Aug. 7, 2018.

* cited by examiner

*Primary Examiner* — Syed A Islam
(74) *Attorney, Agent, or Firm* — MacMillan, Sobanski & Todd, LLC (57) ABSTRACT

A seat assembly includes a back portion that is mounted for rotational movement about a seat back axis between a first seat position and a second seat position. The seat assembly also includes an armrest mounted for rotational movement about an armrest axis relative to the back portion between a stowed position and a use position. The seat back axis is coaxial with the armrest axis.

13 Claims, 7 Drawing Sheets

PIVOTABLE SEAT BACK WITH COAXIAL PIVOTABLE ARMREST

BACKGROUND OF THE INVENTION

This invention relates to a movable seat back that includes a movable armrest. More specifically, this invention relates to pivotable seat back that includes a pivotable armrest.

Many vehicles include seats having one or more armrests for the comfort of passengers. For example, a vehicular bench seat may include a center armrest for shared use by passengers on either side. Many of such armrests are able to be moved between a use position and a stowed position. Typically, an armrest may be moved between the two positions by pivoting it relative to the seat. Thus, the center armrest on the bench seat may be positioned in the use position, where it is available for use by two adjacent passengers, or it may be located in the stowed position, where the armrest is nested in a seat back so that a third passenger may occupy the center of the bench seat.

Many vehicles have cargo areas, such as trunks or beds, located behind the passenger seats. In some vehicles, the passenger seats may be moved in order to create a larger cargo floor and allow larger items to be transported within the vehicle. A seat back of rear passenger seats may be able to be moved from an upright position, where the seat is available to be occupied by the passenger, to a folded position, where a rear surface of the seat back provides a cargo pass-through or an extended cargo floor. The seat back in these types of seats may be moved by pivoting it relative to the seat base.

In some vehicles, both the armrest is movable and the seat back is movable. For example, the bench seat can include a center seat portion with a pivotable armrest, and the center portion may also be folded down to provide a pass-through to a trunk of the vehicle. When the armrest is in the use position, it is desirable that the armrest be at a position relative to the seat that is convenient and comfortable for the passengers. Additionally, some jurisdictions may have specifications that limit the location of the armrest relative to the seat. The particular position which is most desirable may vary depending on the dimensions of the armrest. However, when both the seat back and the armrest include mechanisms to allow them to pivot, the relative positions of their hinge mechanisms can limit the positioning of the armrest in the use position without additional modifications to the armrest. It would be advantageous to have an improved structure for connecting a pivotable armrest to a pivotable seat back.

SUMMARY OF THE INVENTION

This invention relates to a seat assembly. The seat assembly includes a seat back. The seat back is mounted for rotational movement about a seat back axis between a first seat position and a second seat position. The seat assembly also includes an armrest that is mounted for rotational movement about an armrest axis relative to the seat back between a stowed position and a use position. The seat back axis is coaxial with the armrest axis.

This invention also relates to a seat assembly that includes a first back portion attached to a first base for relative rotational movement about a rotational axis. An axle extends from the first back portion along the rotation axis to a second base. A second back portion is attached to the axle for rotational movement relative to the first back portion about the rotational axis. An armrest is also attached to the axle for rotational movement relative to the second back portion about the rotational axis.

Various aspects of this invention will become apparent to those skilled in the art from the following detailed description of the preferred embodiment, when read in light of the accompanying drawings.

DETAILED DESCRIPTION OF THE PREFERRED EMBODIMENT

Figure 1:
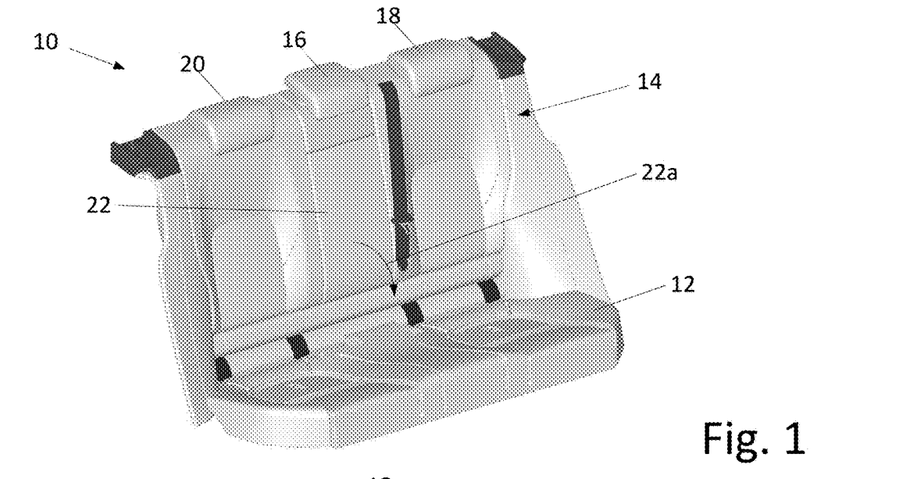
FIG. 1 is a perspective view of a bench seat in accordance with this invention including an armrest shown in a stowed position.

Referring now to the drawings, there is illustrated in FIG. 1 a perspective view of a seat assembly, indicated generally at 10. The illustrated seat assembly 10 is a vehicle bench seat, but it may be any desired type of seat. The seat assembly 10 includes a seat base 12, which provides a bottom support for all occupants of the seat assembly 10. The seat assembly 10 also includes a seat back assembly, indicated generally at 14, which provides a back support for all occupants of the seat assembly 10. The illustrated seat back assembly 14 includes a first back portion 16, a second back portion 18, and a third back portion 20. In the illustrated embodiment, the first back portion 16 is a center portion, and the second back portion 18 and the third back portion 20 are side portions located on opposed sides of the first back portion 16. However, the seat back assembly 14 may include any desired number and positioning of back portions.

Figure 2:
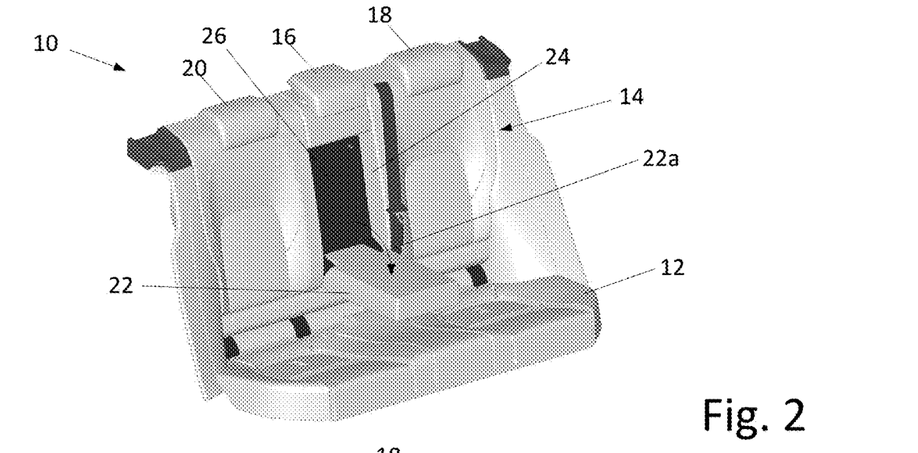
FIG. 2 is a perspective view of the bench seat illustrated in FIG. 1 showing the armrest in a use position.

The seat assembly 10 includes an armrest 22 that is located on the seat back assembly 14. The illustrated armrest 22 is located adjacent to the first back portion 16, but may be located in any desired position on the seat back assembly 14. The armrest 22 is a movable armrest that may be pivoted relative to the first back portion 16 between a stowed position (shown in FIG. 1) and a use position (shown in FIG. 2). The illustrated armrest 22 is pivoted in an armrest rotation direction 22*a* relative to the first back portion 16 when it is moved from the stowed position to the use position. When the armrest 22 is in the stowed position, it is located in an armrest nest 24 having a back 26 in the first back portion 16 so that the seat assembly 10 is adapted to accommodate three occupants. When the armrest 22 is in the use position, the seat assembly 10 is adapted to accommodate two occupants, with the armrest 22 located between them.

Figure 3:
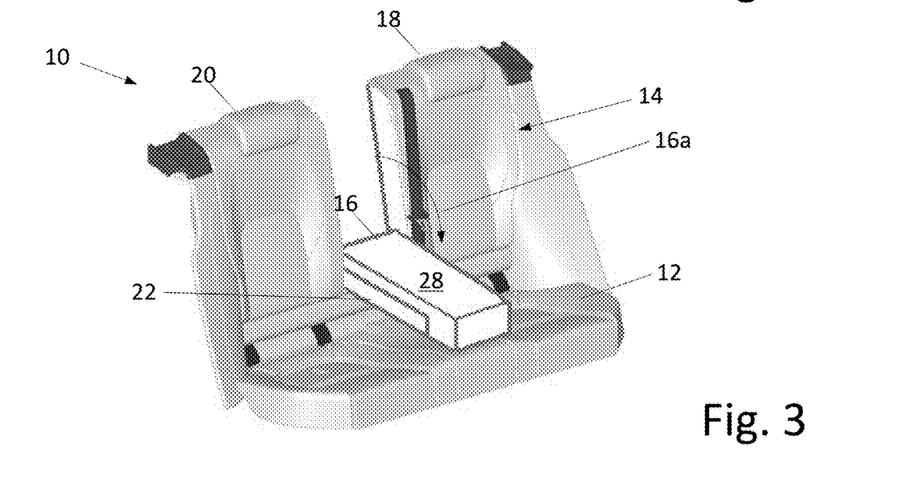
FIG. 3 is a perspective view of the bench seat illustrated in FIG. 2 showing a seat portion in a folded position.

The first back portion 16 of the seat back assembly 14 may also be moved relative to the seat base 12 between a first seat position and a second seat position. The illustrated first back portion 16 may be moved between an upright position (shown in FIGS. 1 and 2) and a folded position (shown in FIG. 3). However, the first seat position and the second seat position may be any desired positions of the first back portion 16. The illustrated first back portion 16 is pivoted in a seat back rotation direction 16a relative to the seat base 12 when it is moved from the upright position to the folded position. However, the first back portion 16 may be moved in any desired fashion. When in the folded position, the first back portion 16 provides an extended cargo surface 28. In the illustrated seat assembly 10, the second back portion 18 and the third back portion 20 may also be moved from their respective upright positions (shown in FIG. 3) to folded positions (not shown) if desired.

Figure 4:
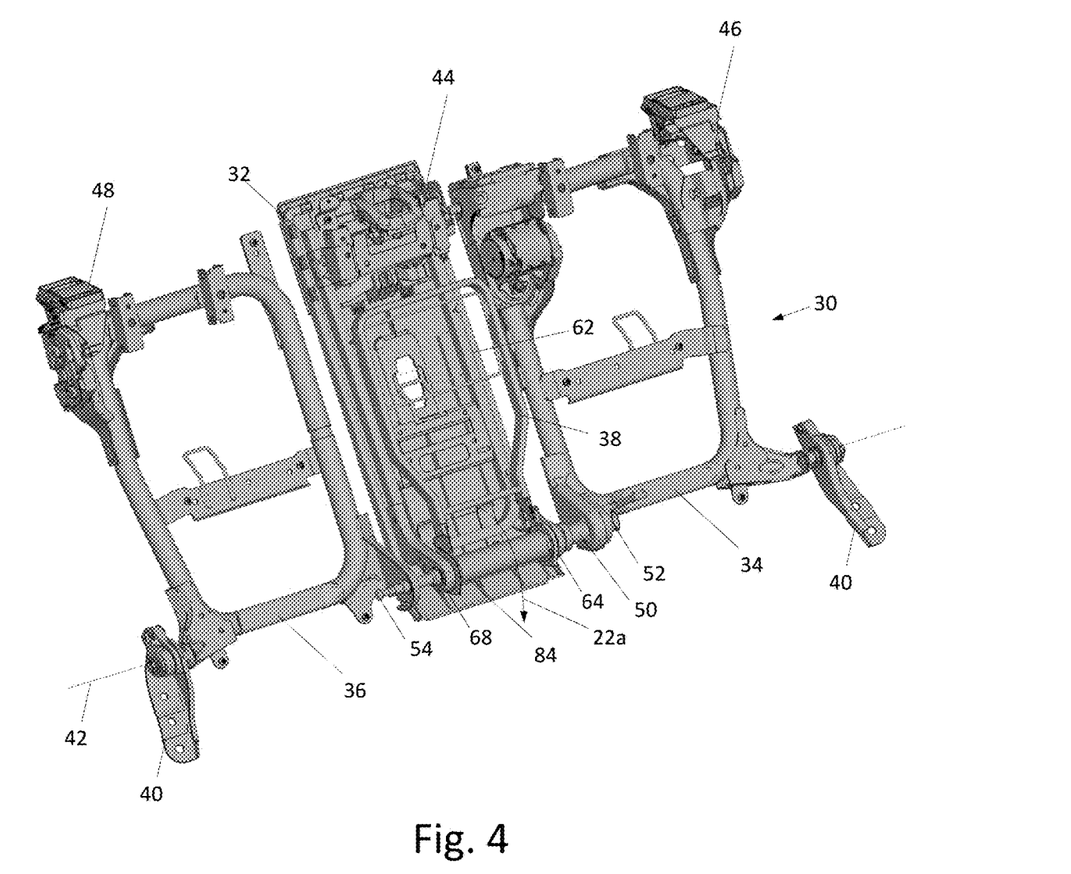
FIG. 4 is an enlarged perspective view of a seat back frame and an armrest frame of the bench seat illustrated in FIG. 1.

Referring to FIG. 4, a perspective view of the seat back assembly 14 is illustrated having the conventional foam and trim components thereof removed so that a seat back assembly frame, indicated generally at 30, is visible. The seat back assembly frame 30 includes a first seat back frame 32, a second seat back frame 34, a third seat back frame 36, and an armrest frame 38. In FIG. 4, the first seat back frame 32, the second seat back frame 34, and the third seat back frame 36 are shown in their upright positions and the armrest frame 38 is shown in the stowed position relative to the first seat back frame 32.

The seat back assembly 14 is attached to a vehicle frame (not shown) by a plurality of bases 40. Each illustrated base 40 is a metal bracket, and each provides a rotational connection to the seat back assembly 14. However, the seat back assembly 14 may be attached to the vehicle frame by any desired connector or method. The seat back assembly 14 is able to rotate about a rotation axis 42 that is defined by the bases 40.

In the illustrated embodiment, the seat back assembly 14 includes a first seat back lock 44, a second seat back lock 46, and a third seat back lock 48. The first seat back lock 44 is engaged to retain the first seat back frame 32 in position relative to the second seat back frame 34. The first seat back lock 44 may be released to allow the first seat back frame 32 to move relative to the second seat back frame 34. As will be described in greater detail below, the first seat back frame 32 is able to rotate relative to the second seat back frame 34 and the third seat back frame 36 about the rotation axis 42. The second seat back lock 46 is engaged to retain the second seat back frame 34 in position relative to the base 40. The second seat back lock 46 may be released to allow the second seat back frame 34 to move relative to the base 40. The second seat back frame 34 is able to rotate relative to the base 40 about the rotation axis 42. The third seat back lock 48 is engaged to retain the third seat back frame 36 in position relative to the base 40. The third seat back lock 48 may be released to allow the third seat back frame 36 to move relative to the base 40. The third seat back frame 36 is able to rotate relative to the base 40 about the rotation axis 42. Additionally, as will be described in greater detail below, the armrest frame 38 is able to rotate relative to the first seat back frame 32 about the rotation axis 42.

Referring back to FIG. 1, when the seat back locks 44, 46, and 48 are engaged, the first back portion 16, the second back portion 18, and the third back portion 20 are retained in their respective upright positions relative to the seat base 12. The armrest 22 may be moved relative to the seat base 12 between the stowed and use positions by rotating it about the rotation axis 42. If the first seat back lock 44 is released, the first back portion 16 may be moved between its upright position and its folded position by rotating about the rotation axis 42. When first back portion 16 is moved from the upright position to the folded position, the back 26 of the armrest nest 24 will engage the armrest 22 and move the armrest 22 along with the first back portion 16. When the first back portion 16 and the second back portion 18 are in their upright positions and the second seat back lock 46 is released, the second back portion 18 may be moved from the upright position to a folded position by rotating about the rotation axis 42. The first seat back lock 44 will retain the first back portion 16 in position relative to the second back portion 18 so that it will move relative to the seat base 12 along with the second back portion 18 and the first back portion 16 and the second back portion 18 will move as one. Additionally, the third seat back lock 48 may be released to allow the third back portion 20 to be moved from its upright position to a folded position by rotating about the rotation axis 42.

Figure 5:
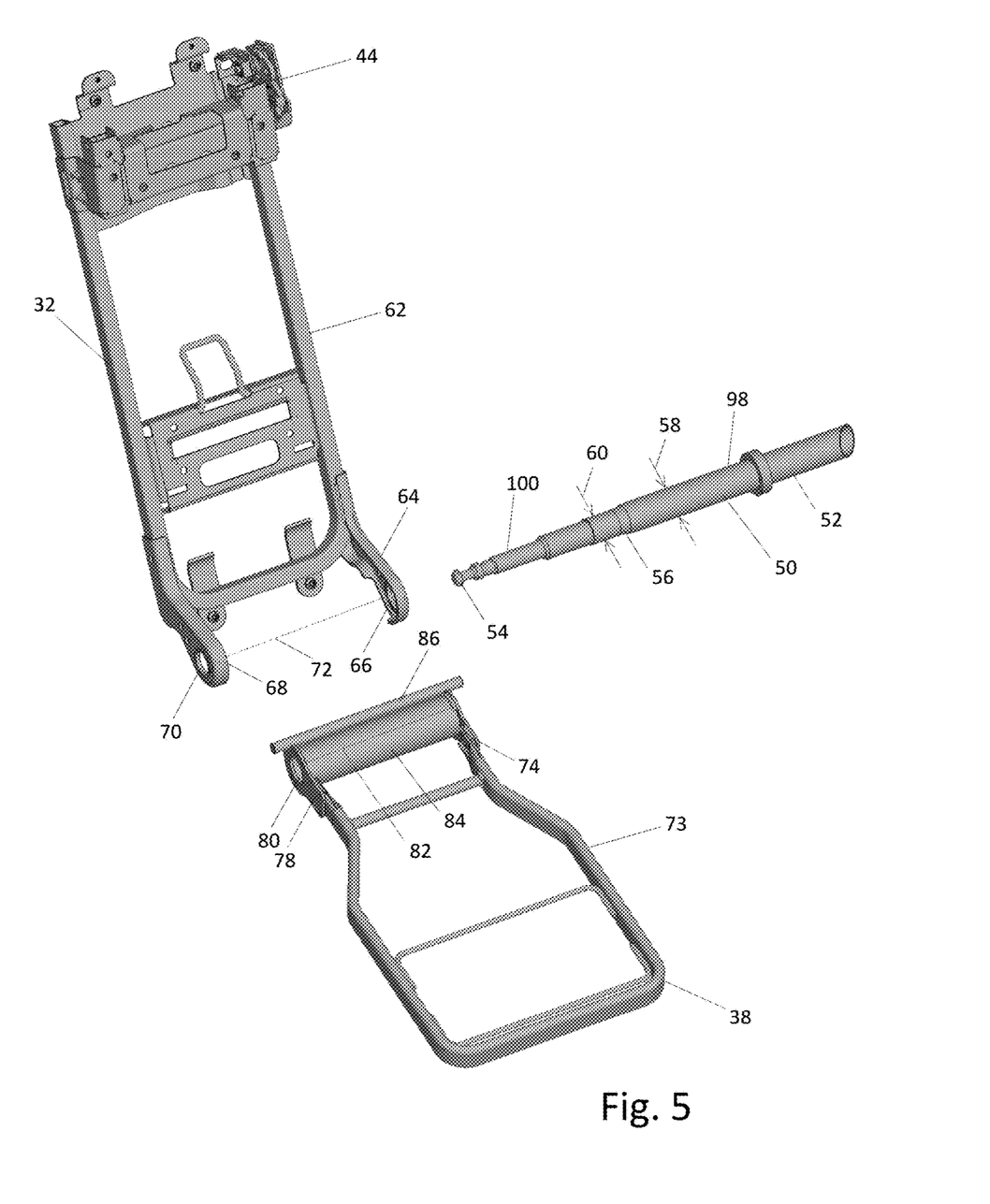
FIG. 5 is a further enlarged, exploded, perspective view of a center portion of the seat back frame illustrated in FIG. 4.

Referring to FIG. 5, an exploded perspective view of a portion of the seat back assembly frame 30 is shown. The seat back assembly frame 30 includes an axle 50 that extends along the rotation axis 42. The illustrated axle 50 has a circular cross-sectional shape, but may have any desired shape. The illustrated axle 50 is fixed to the second seat back frame 34, but may be attached to any desired part of the seat back assembly frame 30 in any desired manner. The axle 50 extends from a mounted end 52 that is attached to the second seat back frame 34 to an outer end 54. The axle 50 includes a restriction 56 where the shape of the axle 50 changes from a first outer dimension 58 to a second outer dimension 60. In the illustrated embodiment, the first outer dimension 58 is a first diameter and the second outer dimension 60 is a second diameter that is smaller than the first diameter.

The seat back frame 32 includes a steel seat back base 62 that defines a general rectangular shape. However, the first seat back frame 32 may have any desired shape and may be constructed of any desired materials. The first seat back frame 32 also includes a first seat back bracket 64 that includes a first seat axle opening 66 and a second seat back bracket 68 that includes a second seat axle opening 70. The first seat axle opening 66 is a circular opening through the first seat back bracket 64, but it may have any desired shape. Similarly, the second seat axle opening 70 is a circular opening through the second seat back bracket 68, but it may also have any desired shape. A seat back axis 72 is defined by the first seat axle opening 66 and the second seat axle opening 70.

The armrest frame 38 includes a steel armrest base 73 that defines a general rectangular shape. However, the armrest frame 38 may have any desired shape and may be constructed of any desired materials. The armrest frame 38 also includes a first armrest bracket 74 that includes a first armrest axle opening 76 (shown in FIG. 9) and a second armrest bracket 78 that includes a second armrest axle opening 80. The first armrest axle opening 76 is a circular opening through the first armrest bracket 74, but it may have any desired shape. Similarly, the second armrest axle opening 80 is a circular opening through the second armrest bracket 78, but it may also have any desired shape. An armrest axis 82 is defined by the first armrest axle opening 76 and the second armrest axle opening 80. The illustrated armrest includes an axle surround 84 that extends from the first armrest bracket 74 to the second armrest bracket 78 and that is located around the armrest axis 82. The illustrated axle surround 84 is a hollow tube that is welded to the first armrest bracket 74 and to the second armrest bracket 78, but the axle surround 84 may be attached to the armrest frame 38 by any desired fastener or method. The armrest frame 38 also includes a stop rod 86 that is adapted to limit the movement of the armrest 22 relative to the first back portion 16, as is known in the art. The illustrated stop rod 86 is a steel rod that extends parallel to the armrest axis 82 and is welded to the axle surround 84. However, the stop rod 86 may be made of any desired material and may be attached to the armrest frame 38 by any desired fastener or method. Further, any desired stop mechanism may be used to limit the movement of the armrest 22 relative to the first back portion 16.

Figure 6:
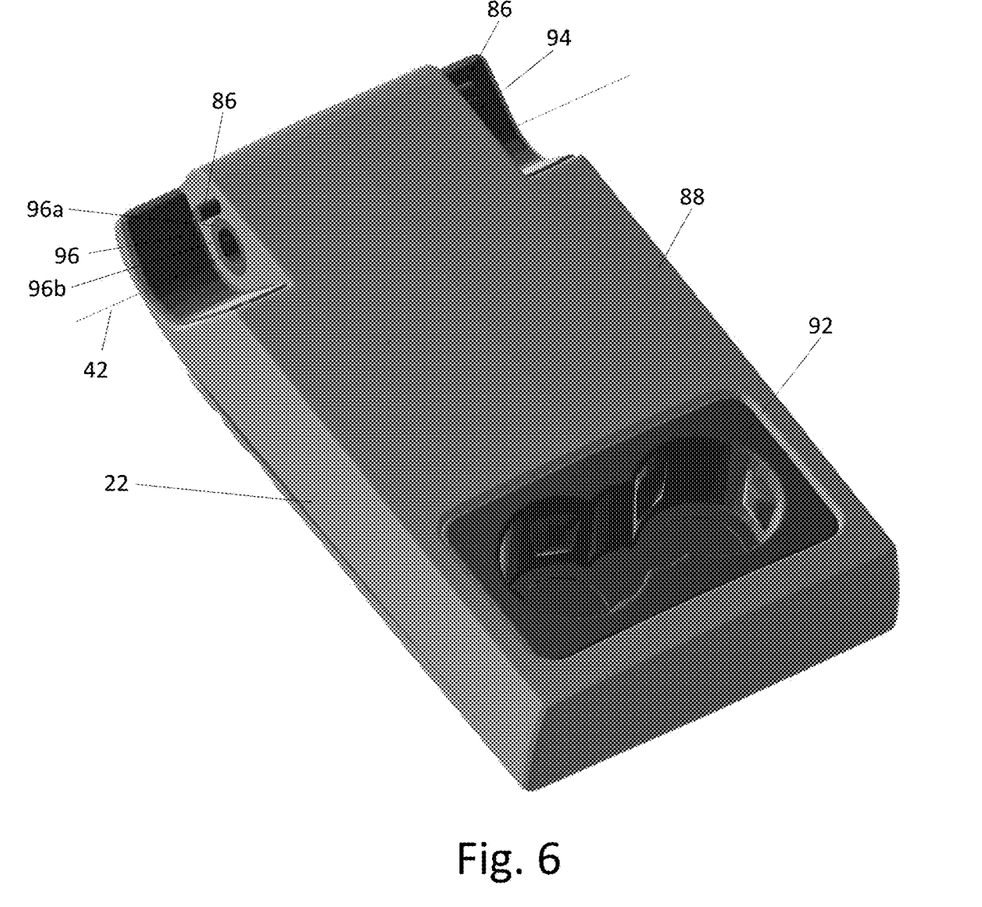
FIG. 6 is a perspective view of the assembled armrest.

Referring to FIG. 6, a perspective view of the assembled armrest 22 is shown. The illustrated armrest 22 includes an armrest trim 88 that is located over an armrest foam (not visible in FIG. 6). The foam on the illustrated armrest 22 is overmolded onto the armrest frame 38, but it may be attached by any desired method. The illustrated armrest 22 includes an optional cup holder 92, but it may include any desired features for the use or convenience of the occupants. The armrest 22 includes a first trim retainer 94 and a second trim retainer 96. Each trim retainer 94 and 96 is made of plastic, but they may be made of any desired material. The first trim retainer 94 includes a first retainer body 94a and a first retainer bushing 94b (shown in FIG. 9) that extends from the first retainer body 94a. When the armrest 22 is assembled, the first retainer bushing 94b is inserted into the first armrest axle opening 76 on the first armrest bracket 74, and the armrest trim 88 is trapped between the first armrest bracket 74 and the first retainer body 94a. Similarly, the second trim retainer 96 includes a second retainer body 96a and a second retainer bushing 96b that extends from the second retainer body 96a. When the armrest 22 is assembled, the second retainer bushing 96b is inserted into the second armrest axle opening 80 on the second armrest bracket 78, and the armrest trim 88 is trapped between the second armrest bracket 78 and the second retainer body 96a.

Figure 7:
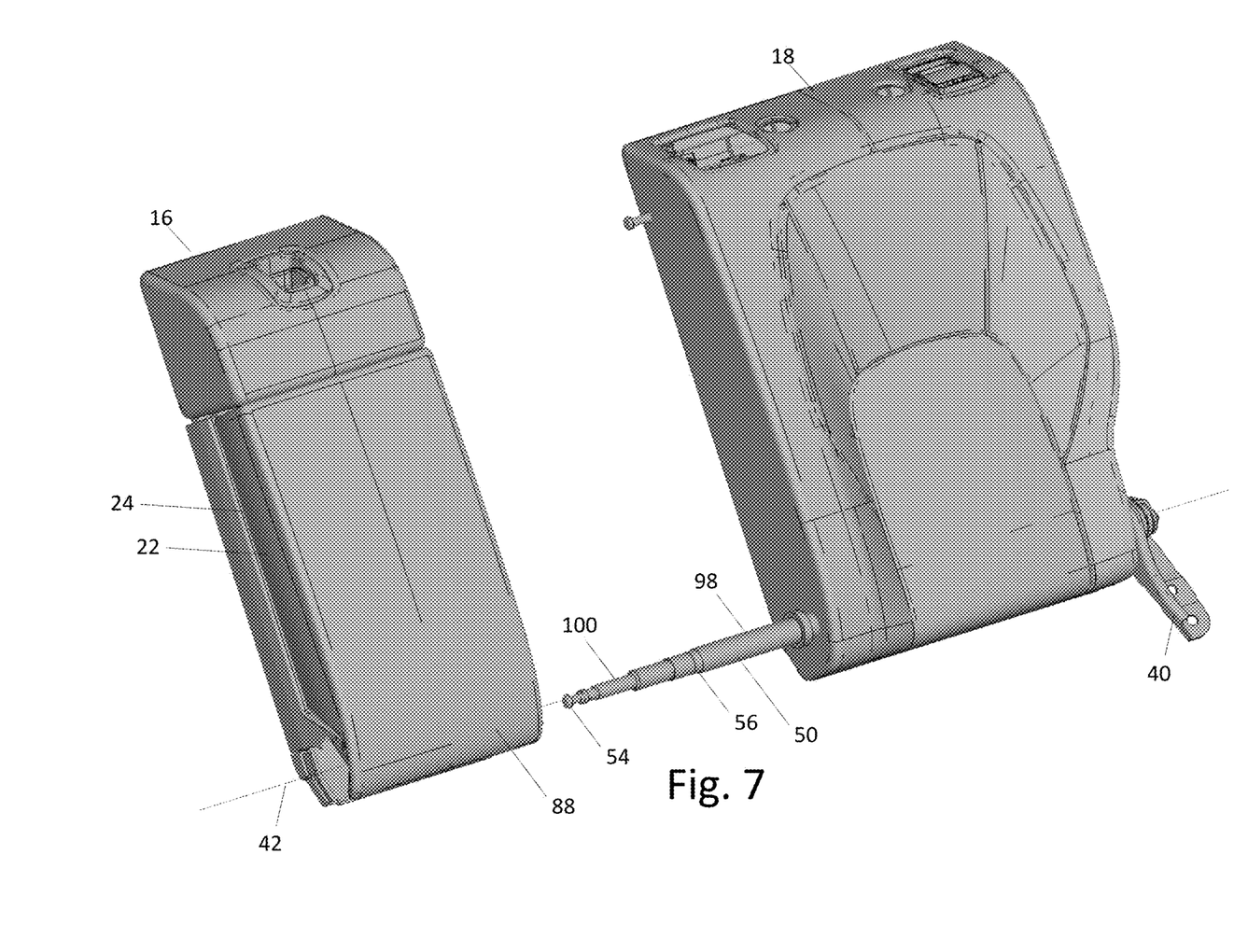
FIG. 7 is a perspective view of the trimmed center portion and a trimmed side portion of the bench seat illustrated in FIG. 1.

Referring to FIG. 7, a perspective view of the first back portion 16 and the armrest 22 are shown, prior to connection to the axle 50. The armrest 22 is positioned in the nest 24 of the first back portion 16, and the armrest axis 82 is coaxial with and overlaid on the seat back axis 72. The first armrest bracket 74 and the second armrest bracket 78 are located between the first seat back bracket 64 and the second seat back bracket 68. From this configuration, the first back portion 16 and armrest 22 may be moved relative to the axle 50 so that the outer end 54 of the axle 50 passes through the first seat back bracket 64, the first armrest bracket 74, the second armrest bracket 78, and the second seat back bracket 68. The axle 50 is then attached to one of the bases 40 to put the first back portion 16, the armrest 22, and the second back portion 18 into the configuration shown in FIG. 8. At this point, the armrest axis 82 and the seat back axis 72 are coaxial with the rotation axis 42.

Figure 8:
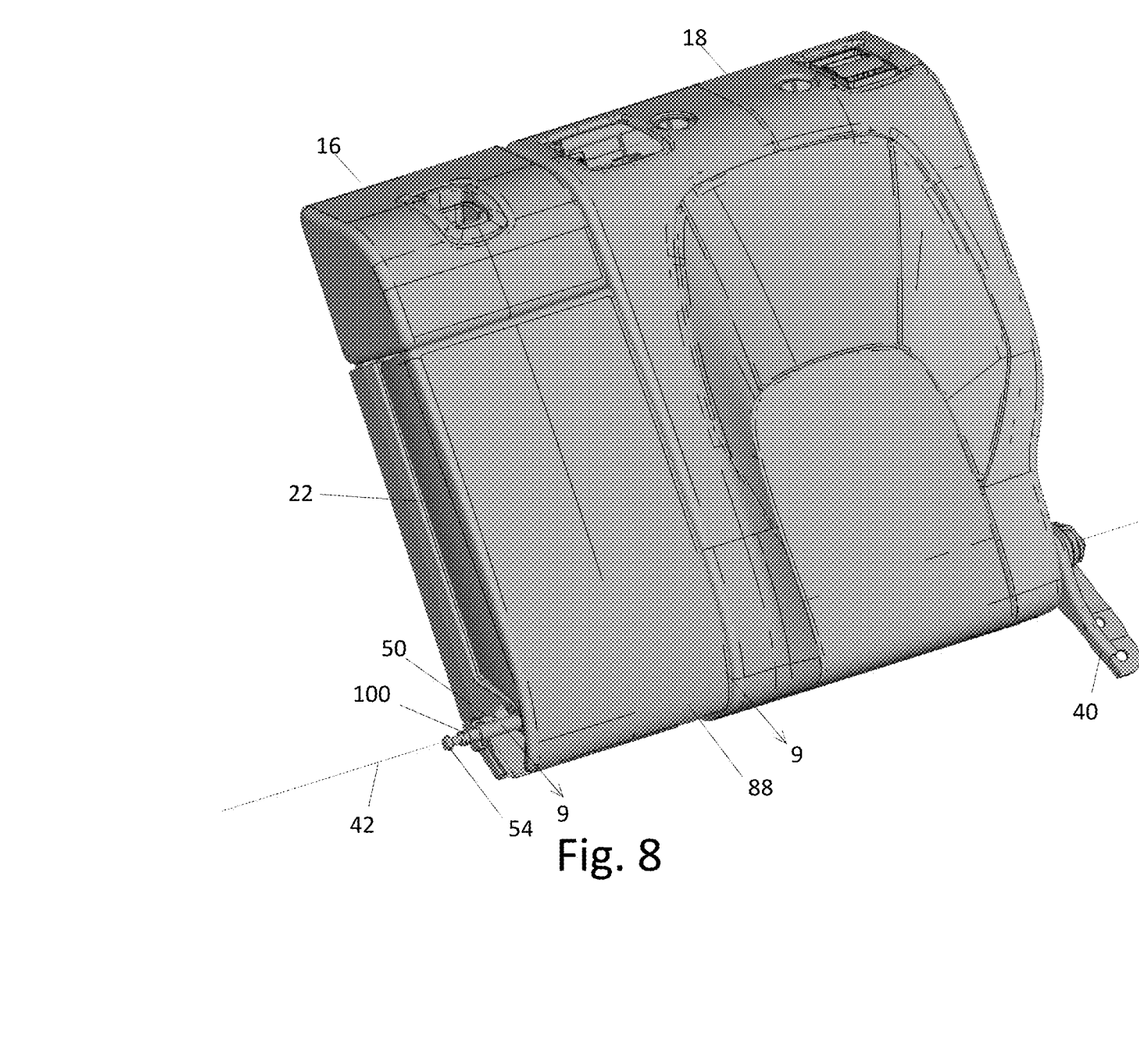
FIG. 8 is perspective view of the center portion and side portion illustrated in FIG. 7, shown with the center portion attached to the side portion.
Figure 9:
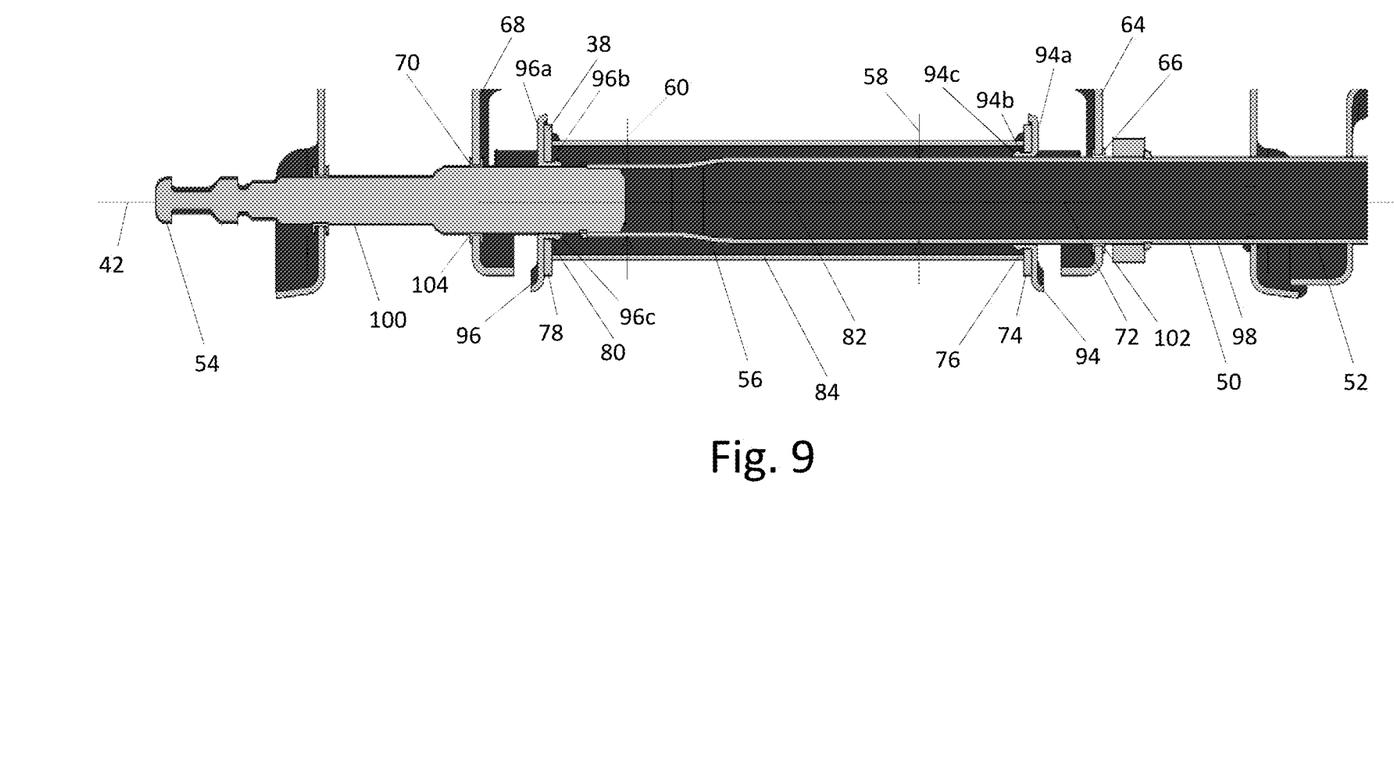
FIG. 9 is a cross-sectional view taken along the line 9-9 of FIG. 8.

Referring to FIG. 9, a cross-section view taken along the line 9-9 of FIG. 8 through the rotation axis 42 is shown. The illustrated axle 50 includes a hollow tube section 98 and a solid fixation section 100, but it may have any desired construction. As previously described, the axle 50 includes the first outer dimension 58 and the second outer dimension 60 that are separated by the restriction 56. The illustrated restriction 56 is located in the hollow tube section 98 of the axle 50, but it may be located in any desired location on the axle 50.

A first seat back bushing 102 is located in the first seat axle opening 66, between the first seat back bracket 64 and the axle 50. The first seat axle opening 66 is located around a portion of the axle 50 having the first outer dimension 58 and is preferably slighter larger than the first outer dimension 58 to allow the first seat back bushing 102 to fit between the first seat back bracket 64 and the axle 50. A second seat back bushing 104 is located in the second seat axle opening 70, between the second seat back bracket 68 and the axle 50. The second seat axle opening 70 is located around a portion of the axle 50 having the second outer dimension 60 and is preferably slighter larger than the second outer dimension 60 to allow the second seat back bushing 104 to fit between the second seat back bracket 68 and the axle 50. In the illustrated embodiment, the second seat axle opening 70 is smaller than the first seat axle opening 66, but the openings 66 and 70 may have any desired relative sizes.

As previously described, the first retainer bushing 94b is located in the first armrest axle opening 76 between the first armrest bracket 74 and the axle 50. The first armrest axle opening 76 is located around a portion of the axle 50 having the first outer dimension 58 and is preferably slightly larger than the first outer dimension 58 to allow the first retainer bushing 94b to fit between the first armrest bracket 74 and the axle 50. The first retainer bushing 94b includes retainer teeth 94c that are located on an opposed side of the first armrest bracket 74 from the first retainer body 94a. When the first retainer bushing 94b is located between the first armrest bracket 74 and the axle 50, the resilient first retainer bushing 94b is unable to deflect relative to the first armrest bracket 74 and the first trim retainer 94 is retained in position relative to the first armrest bracket 74.

Similarly, the second retainer bushing 96b is located in the second armrest axle opening 80, between the second armrest bracket 78 and the axle 50. The second armrest axle opening 80 is located around a portion of the axle 50 having the second outer dimension 60 and is preferably slightly larger than the second outer dimension 60 to allow the second retainer bushing 96b to fit between the second armrest bracket 78 and the axle 50. The second retainer bushing 96b includes retainer teeth 96c that are located on an opposed side of the second armrest bracket 78 from the second retainer body 96a. When the second retainer bushing 96b is located between the second armrest bracket 78 and the axle 50, the resilient second retainer bushing 96b is unable to deflect relative to the second armrest bracket 78, and the second trim retainer 96 is retained in position relative to the second armrest bracket 78. In the illustrated embodiment, the second armrest axle opening 80 is smaller than the first armrest axle opening 76, but the openings 76 and 80 may have any desired relative sizes.

The principle and mode of operation of this invention have been explained and illustrated in its preferred embodiment. However, it must be understood that this invention may be practiced otherwise than as specifically explained and illustrated without departing from its spirit or scope.

What is claimed is:

1. A seat assembly comprising:
   a seat base;
   a back portion mounted for rotational movement relative to the seat base about a seat back axis between a first seat position and a second seat position, the back portion including a nest; and
   an armrest mounted for rotational movement relative to the back portion about an armrest axis between a stowed position, wherein the armrest is located in the nest so that a passenger may occupy both the seat base and the back portion of the seat assembly, and a use position, wherein the armrest is located adjacent to the seat base;

wherein the seat back axis is coaxial with the armrest axis.

2. The seat assembly of claim 1, further including an axle extending along the seat back axis, wherein the back portion is mounted on the axle for relative rotational movement, and wherein the armrest is mounted on the axle for relative rotational movement.

3. The seat assembly of claim 1, further including a second back portion mounted on the seat base for relative rotational movement about the seat back axis and an axle attached to the second back portion and extending along the seat back axis, wherein the back portion is mounted on the axle for relative rotational movement, and wherein the armrest is mounted on the axle for relative rotational movement.

4. The seat assembly of claim 3, wherein a first mount location of the axle is attached to the second back portion, and wherein a second mount location of the axle is attached to the base for relative rotational movement.

5. The seat assembly of claim 4, wherein the back portion is attached to the axle between the first mount location and the second mount location, and wherein the armrest is attached to the axle between the first mount location and the second mount location.

6. The seat assembly of claim 5, further including a third back portion mounted on the seat base for relative rotational movement about the seat back axis, wherein the third back portion is attached to the axle.

7. The seat assembly of claim 6, wherein the back portion is located between the second back portion and the third back portion.

8. A seat assembly comprising:
a seat base;
a first back portion that is attached to a first mount for rotational movement relative to the seat base about a rotational axis, the back portion including a nest;
an axle that extends from the first back portion along the rotational axis to a second mount;
a second back portion that is attached to the axle for rotational movement relative to the first back portion about the rotational axis; and
an armrest attached to the axle for rotational movement relative to the second back portion about the rotational axis between a stowed position, wherein the armrest is located in the nest so that a passenger may occupy both the seat base and the back portion of the seat assembly, and a use position, wherein the armrest is located adjacent to the seat base.

9. The seat assembly of claim 8, further including a third back portion that is attached to the axle and a third mount for relative rotational movement about the rotational axis.

10. A seat assembly comprising:
a seat base; and
a seat back assembly including (1) a back portion that is movable about an axis between an upright position and a folded position relative to the seat base, the back portion including a nest, and (2) an armrest that is movable relative to the back portion about the axis between a stowed position, wherein the armrest is located in the nest so that a passenger may occupy both the seat base and the back portion of the seat assembly, and a use position, wherein the armrest is located adjacent to the seat base.

11. The seat assembly of claim 10, wherein the seat back assembly is a first seat back assembly, and further including a second seat back assembly disposed adjacent to the first seat back assembly and including a second back portion that is movable about the axis between an upright position and a folded position relative to the seat base.

12. The seat assembly of claim 11, further including a third seat back assembly disposed adjacent to the first seat back assembly and including a third back portion that is movable about the axis between an upright position and a folded position relative to the seat base.

13. The seat assembly of claim 10, further including an axle extending along the axis, and wherein both the back portion and the armrest are mounted on the axle for movement about the axis.

* * * * *